United States Patent
Ahn et al.

(10) Patent No.: US 9,913,297 B2
(45) Date of Patent: Mar. 6, 2018

(54) METHOD AND DEVICE FOR COMMUNICATING IN UNLICENSED BAND

(71) Applicant: LG ELECTRONICS INC., Seoul (KR)

(72) Inventors: Joonkui Ahn, Seoul (KR); Hanbyul Seo, Seoul (KR); Seungmin Lee, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/502,175

(22) PCT Filed: Aug. 6, 2015

(86) PCT No.: PCT/KR2015/008228
§ 371 (c)(1),
(2) Date: Feb. 6, 2017

(87) PCT Pub. No.: WO2016/021945
PCT Pub. Date: Feb. 11, 2016

(65) Prior Publication Data
US 2017/0231013 A1    Aug. 10, 2017

Related U.S. Application Data

(60) Provisional application No. 62/034,191, filed on Aug. 7, 2014.

(51) Int. Cl.
*H04B 1/18* (2006.01)
*H04W 74/08* (2009.01)
(Continued)

(52) U.S. Cl.
CPC ....... *H04W 74/0883* (2013.01); *H04L 1/0025* (2013.01); *H04L 1/0026* (2013.01); *H04W 74/002* (2013.01); *H04W 74/0858* (2013.01)

(58) Field of Classification Search
CPC .......... H04W 74/0883; H04W 74/0858; H04L 1/0025; H04L 1/0026
(Continued)

(56) References Cited

U.S. PATENT DOCUMENTS

2007/0242621 A1    10/2007 Nandagopalan et al.
2010/0034139 A1*   2/2010 Love ............... H04L 1/0029
                                                        370/328
(Continued)

FOREIGN PATENT DOCUMENTS

WO        2013006006        1/2013

OTHER PUBLICATIONS

PCT International Application No. PCT/KR2014/008228, International Search Report dated Nov. 16, 2015, 2 pages.
(Continued)

*Primary Examiner* — Sanh Phu
(74) *Attorney, Agent, or Firm* — Lee Hong Degerman Kang & Waimey

(57) ABSTRACT

Provided are a method for communicating in a wireless communication system and a device using the same. A wireless device receives a switching command instructing the switching between a clear channel assessment (CCA) operation and a non-CCA operation in an unlicensed band. According to the switching command, the wireless device performs the CCA operation or the non-CCA operation in the unlicensed band.

7 Claims, 10 Drawing Sheets

(51) Int. Cl.
*H04W 74/00* (2009.01)
*H04L 1/00* (2006.01)
(58) Field of Classification Search
USPC ...................................................... 455/191.3
See application file for complete search history.

(56) References Cited

U.S. PATENT DOCUMENTS

| | | |
|---|---|---|
| 2013/0012134 A1 | 1/2013 | Jin et al. |
| 2013/0017794 A1 | 1/2013 | Kloper et al. |
| 2013/0203458 A1 | 8/2013 | Charbit et al. |
| 2014/0301351 A1* | 10/2014 | Gao ..................... H04W 74/08 370/329 |

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.2.0, Jun. 2011, 103 pages.

\* cited by examiner

METHOD AND DEVICE FOR COMMUNICATING IN UNLICENSED BAND

CROSS-REFERENCE TO RELATED APPLICATIONS

This application is the National Stage filing under 35 U.S.C. 371 of International Application No. PCT/KR2015/008228, filed on Aug. 6, 2015, which claims the benefit of U.S. Provisional Application No. 62/034,191 filed on Aug. 7, 2014, the contents of which are all hereby incorporated by reference herein in their entirety.

BACKGROUND OF THE INVENTION

Field of the Invention

The present invention relates to wireless communication, and more particularly, to a method for communicating in an unlicensed band in a wireless communication system, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method communicating in an unlicensed band and a device using the same.

In an aspect, a method for communicating in a wireless communication system includes receiving, by a wireless device, a switching command for instructing a switching between a clear channel assessment (CCA) operation and a non-CCA operation in an unlicensed band, and performing, by the wireless device, the CCA operation or the non-CCA operation in the unlicensed band according to the switching command.

The switching command may be received from a cell operating in the licensed band.

The receiving of the switching command may include detecting a control channel having a cyclic redundancy check (CRC) scrambled by an identifier indicating the switching command.

In another aspect, a device in a wireless communication system includes a radio frequency (RF) unit configured to transmit and receive a radio signal, and a processor operatively coupled to the RF unit. The processor is configured to control the RF unit to receive a switching command for instructing a switching between a clear channel assessment (CCA) operation and a non-CCA operation in an unlicensed band, and control the RF unit to perform the CCA operation or the non-CCA operation in the unlicensed band according to the switching command.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP)

long term evolution (LTE based on 3GPP Technical Specification (TS). This is for exemplary purposes only, and the present invention is also applicable to various wireless communication systems.

Figure 1:
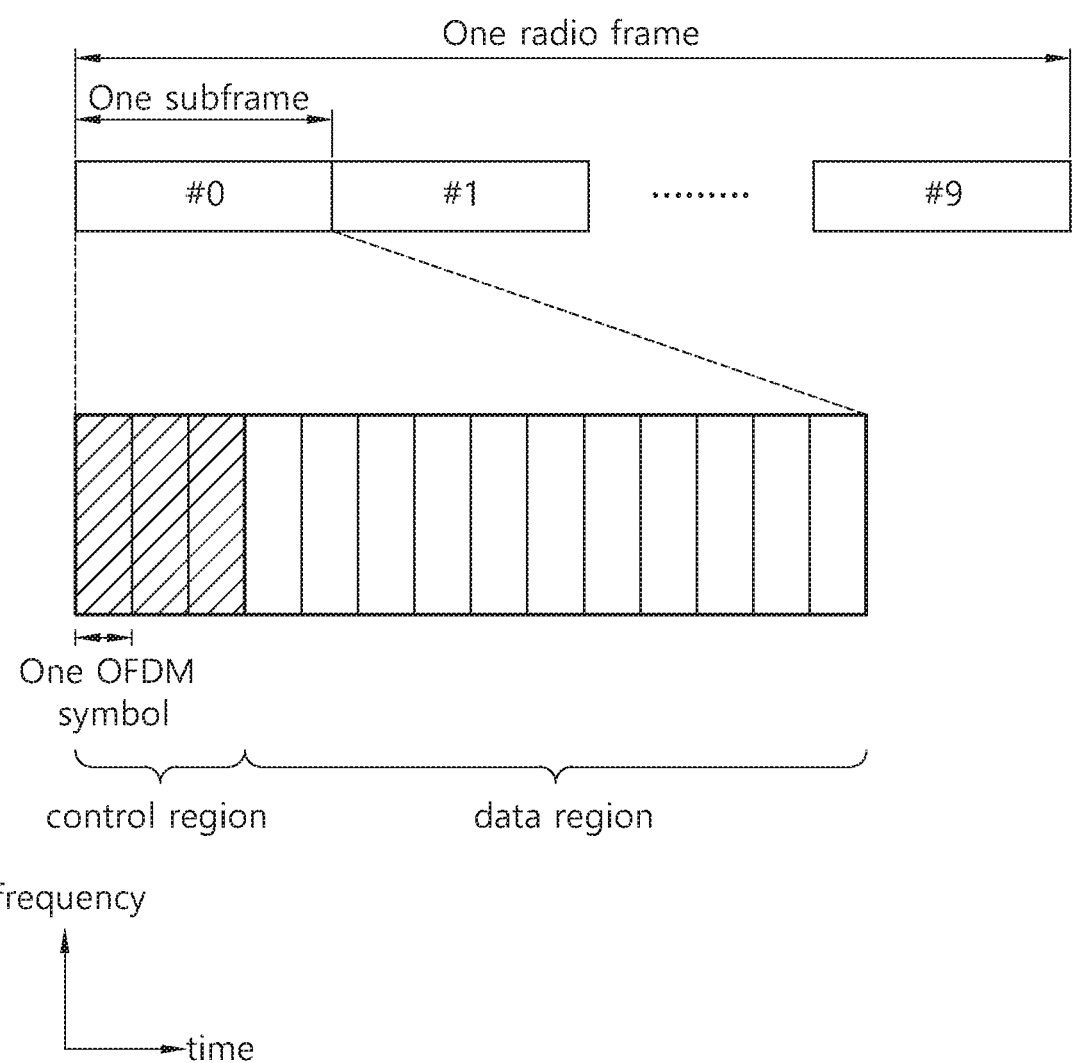
FIG. 1 shows a structure of a downlink radio frame in 3rd generation partnership project (3GPP) long term evolution (LTE).

FIG. 1 shows a structure of a downlink radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A downlink (DL) subframe is divided into a control region and a data region in the time domain. The control region includes up to first four OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

DL control channels are described as follows.

As disclosed in 3GPP TS 36.211 V10.2.0, the 3GPP LTE/LTE-A classifies a physical control channel into a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

In 3GPP LTE-A, uplink (UL) channels include a physical uplink control channel (PUCCH) and a physical uplink shared channel (PUSCH).

A wireless device may be served by a plurality of serving cells under carrier aggregation (CA) or a dual connectivity. Each serving cell may be defined by one downlink (DL) component carrier (CC) or a pair of a DL CC and an uplink (UL) CC.

A serving cell may be classified into a primary cell and a secondary cell. The primary cell is a cell which operates at a primary frequency, performs an initial connection establishment procedure, starts a connection reestablishment procedure, or is designated as a primary cell in a handover procedure. The primary cell refers to a reference cell. The secondary cell may operate at a secondary frequency, may be configured after a Radio Resource Control (RRC) connection is established, and may be used to provide additional radio resources. Substantially, at least one primary cell may be configured, and the secondary cell may be added/modified/released according to higher layer signaling (e.g., radio resource control (RRC)).

A cell index (CI) of the primary cell may be fixed. For example, the lowest CI may be designated as the CI of the primary cell. Hereinafter, a CI of the primary cell is 0, and a CI of the secondary cell is sequentially allocated from 1.

Figure 2:
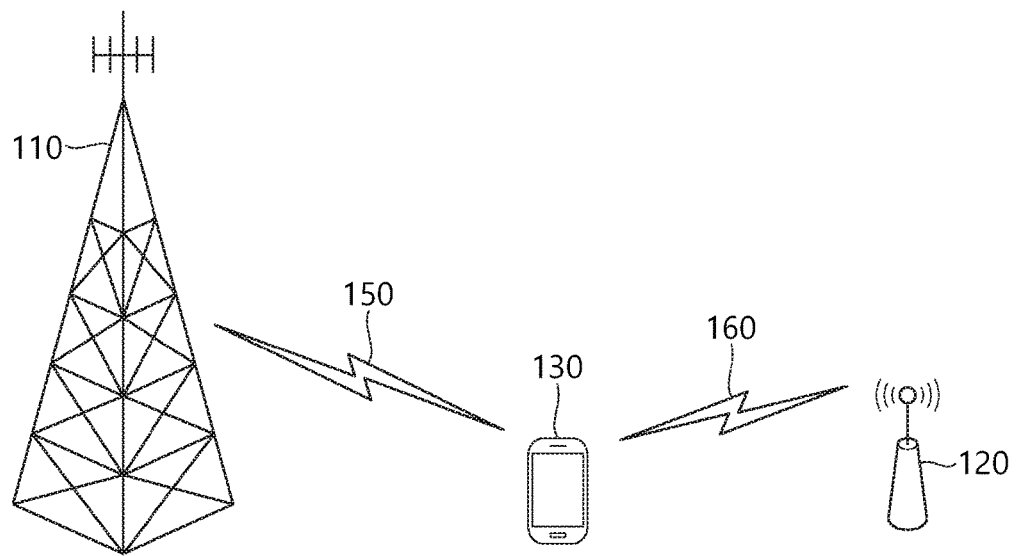
FIG. 2 shows an example of an LTE service using an unlicensed band.

FIG. 2 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. This is called a listen before talk (LBT). A clear channel assessment (CCA) is confirmed when it is determined that no other communication nodes does not send any signals.

The LBT must be performed preferentially in order for a BS or wireless device of an LTE system to have access to a channel in an unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, 'performing LBT' or 'performing CCA' means that a communication node access a channel after the communication node confirms that the channel is idle or that other communication node does not use the channel.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A base station (BS) supports the LTE. A UE is a device supporting the LTE.

Figure 3:
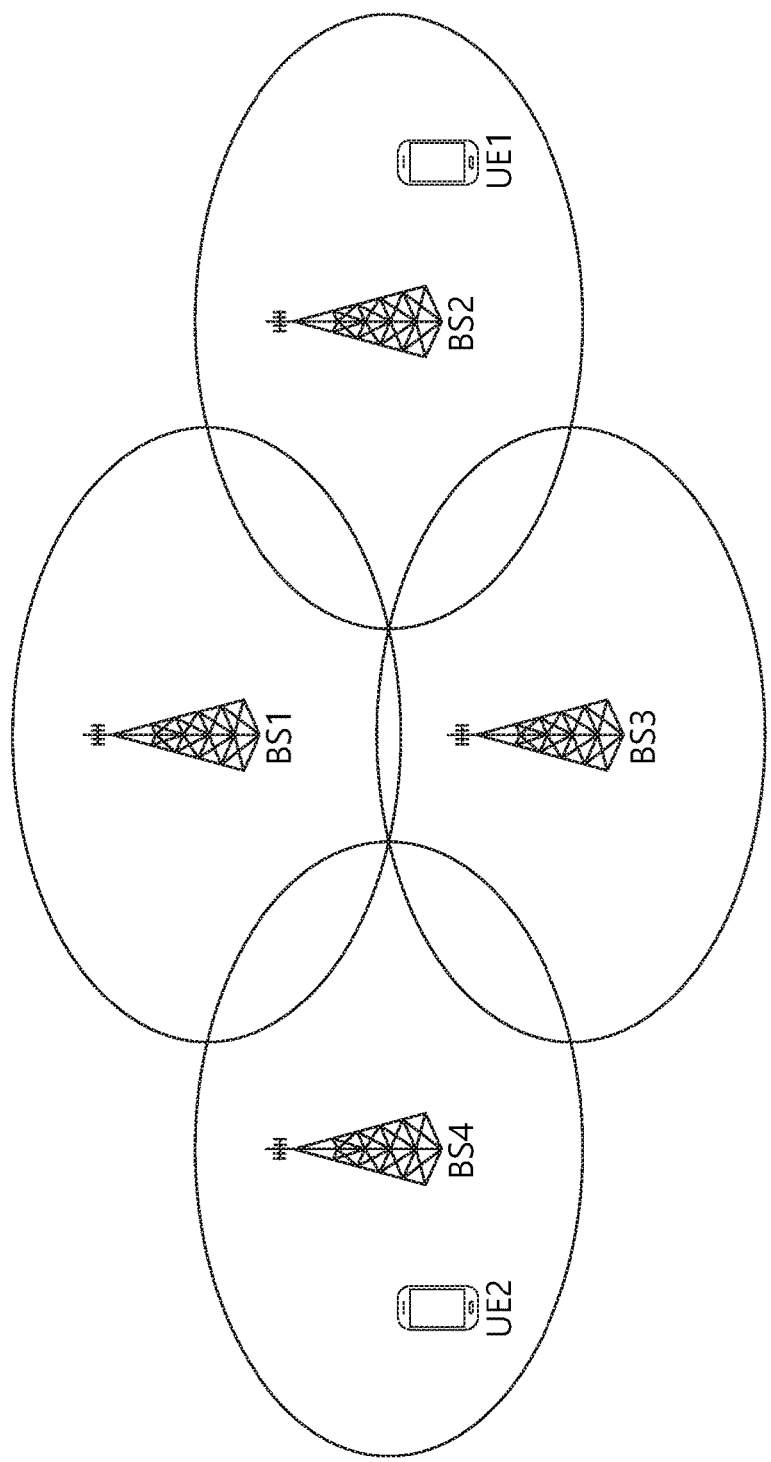
FIG. 3 shows a deployment of a planned wireless communication system.

FIG. 3 shows a deployment of a planned wireless communication system.

Each of a BS1, a BS2, a BS3, and a BS4 has a proper cell coverage, and operates in a planned environment even in an unlicensed band, thereby not requiring an operation such as CCA.

Figure 4:
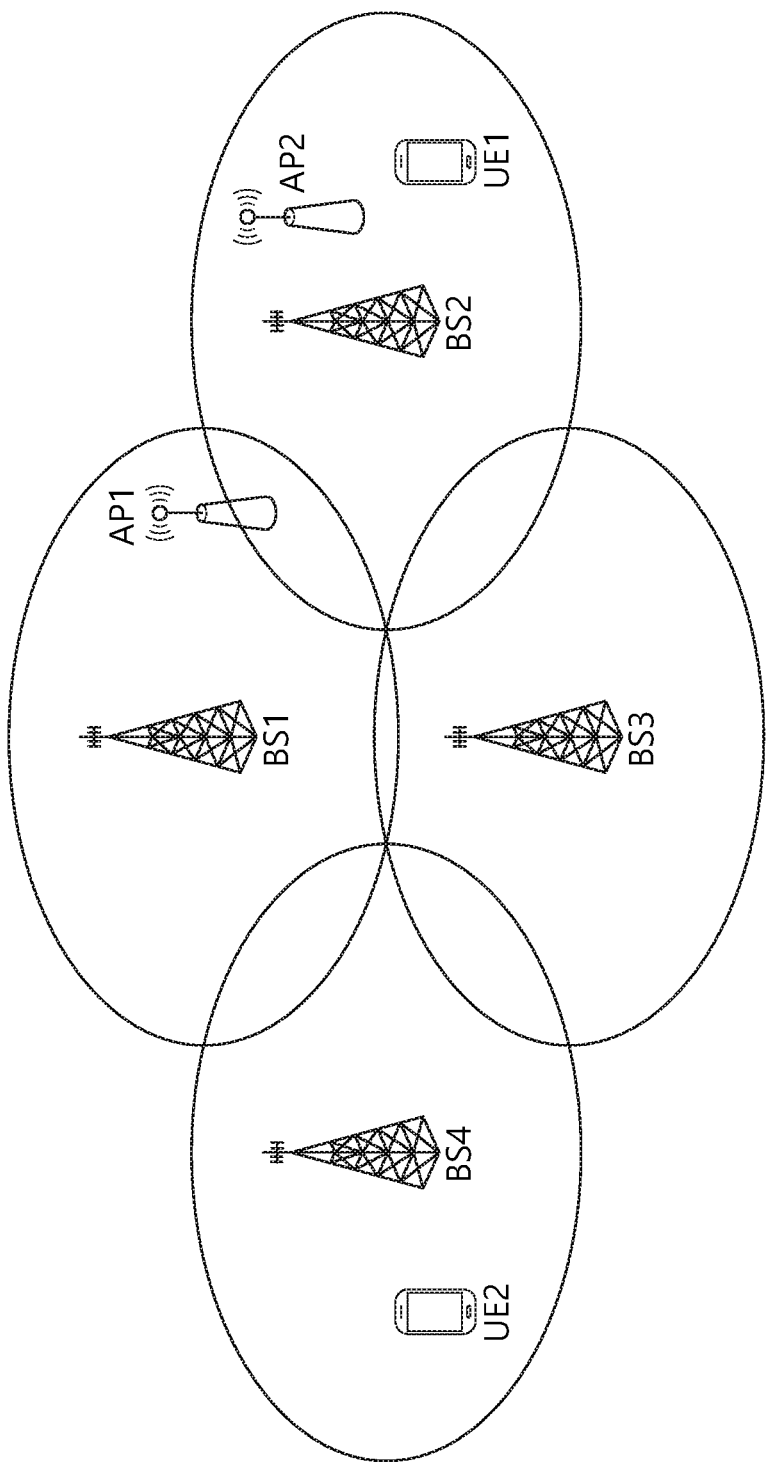
FIG. 4 shows a deployment of an unplanned wireless communication system.

FIG. 4 shows a deployment of an unplanned wireless communication system.

It is shown that an access point (AP) supporting WLAN is deployed in a cell. An AP1 and an AP2 are deployed without proper cell planning, and a CCA operation is required to reduce an interference in an unlicensed band. A BS1 and a BS2 adjacent at least to the AP1 and the AP2 need to perform the CCA.

In the unlicensed band, the CCA operation for DL transmission of the BS may be interpreted differently from a perspective of a UE. The UE may regard that the BS receives a DL signal only at a scheduled time or detects whether DL transmission is performed by receiving a known DL signal. Hereinafter, for convenience, a duration in which the BS intermittently performs DL transmission at any time is called a DL burst.

As described above, since DL transmission in an unlicensed band may not always be guaranteed, a UE operating in the unlicensed band may always maintain an access to a cell operating in a licensed band to reliably control a mobility or radio resource management (RRM) function or the like. Hereinafter, a cell to which the UE has access in the unlicensed band is called an unlicensed cell, and a cell having access to the licensed band is called a licensed cell. For example, the licensed cell may be a primary cell, and the unlicensed cell may be a secondary cell.

Even in case of the unlicensed cell, if each of cells is deployed within a proper coverage as shown in FIG. 3, the CCA operation may be unnecessary. However, if the AP1 and the AP2 are deployed as shown in FIG. 4, there is a need to perform the CCA.

A method of switching between a CCA operation and a non-CCA operation is proposed according to an inter-system/operator interference level measured by a network.

Figure 5:
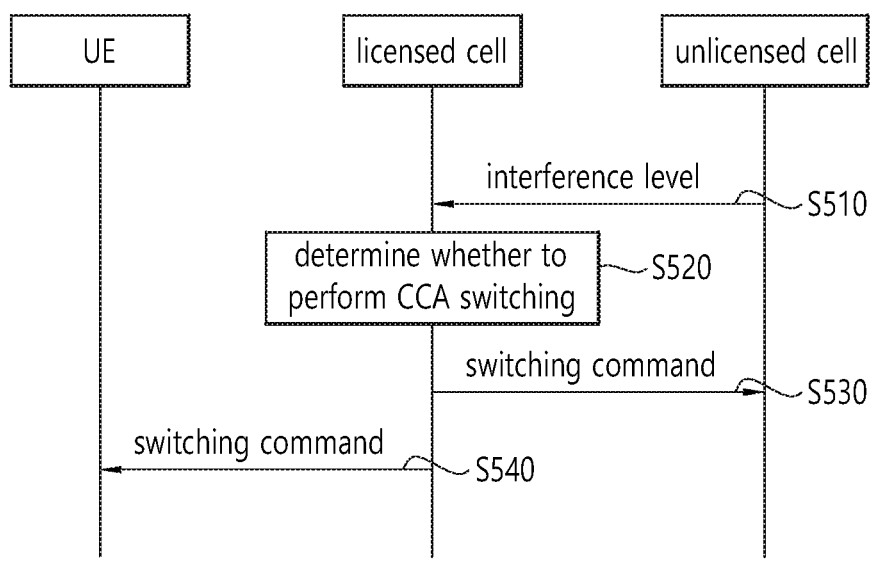
FIG. 5 shows a communication method according to an embodiment of the present invention.

FIG. 5 shows a communication method according to an embodiment of the present invention.

An unlicensed cell reports information regarding an interference level in an unlicensed band to a licensed cell (S510). The licensed cell may receive information regarding the interference level from neighboring other cells.

The licensed cell determines whether the unlicensed cell will perform CCA in the unlicensed band (S520). If it is determined that switching from non-CCA to CCA or from CCA to non-CCA is necessary, the licensed cell may send a switching command to the unlicensed cell (S530).

The licensed cell may also transmit a switching command for switching between a CCA operation and a non-CCA operation to a UE having access to the unlicensed cell (S540). The UE performs switching from non-CCA to CCA or switching from CCA to non-CCA according to the received switching command.

The switching command for the UE may be transmitted in the following manner.

In one embodiment, the switching command may be transmitted through a radio resource control (RRC) message or a medium access control (MAC) message.

In another embodiment, the switching command may be transmitted through a control channel.

Figure 6:
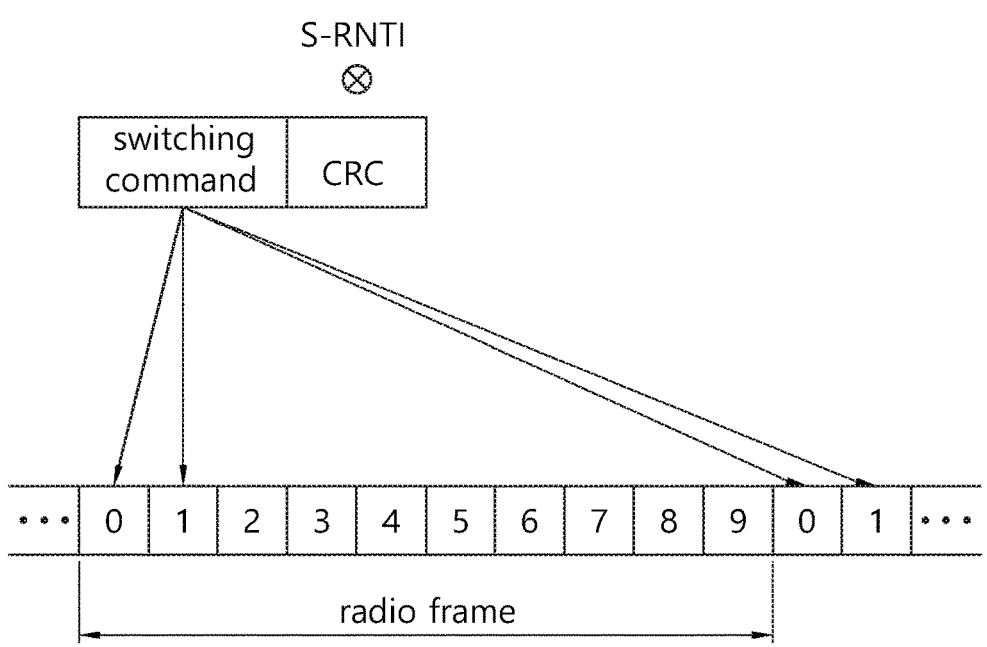
FIG. 6 shows an example of transmitting a switching command through a control channel.

FIG. 6 shows an example of transmitting a switching command through a control channel.

DL information includes the switching command, and a dedicated identifier for identifying the switching command (this is called a switching-radio network temporary identifier (S-RNTI)) is scrambled in CRC of the DL information. The S-RNIT may be a specific cell which is defined to be common to all UEs having access to a licensed cell and to be used to report a corresponding operation switching.

The UE attempts to detect a PDCCH having the switching command in a predetermined period. Herein, it is shown that the PDCCH having the switching command is transmitted in subframes 0 and 1 of every radio frame. The PDCCH having the switching command may be repetitively transmitted in every corresponding subframe so that a UE which has failed in detection of the PDCCH can attempt the detection again. The UE may assume that a PDCCH scrambled by an S-RNTI for a specific duration has the same switching command.

The licensed cell may report to the UE in advance about information regarding a subframe and/or period for attempting the detection of the PDCCH having the switching command.

Now, a switching of a carrier frequency will be described.

Figure 7:
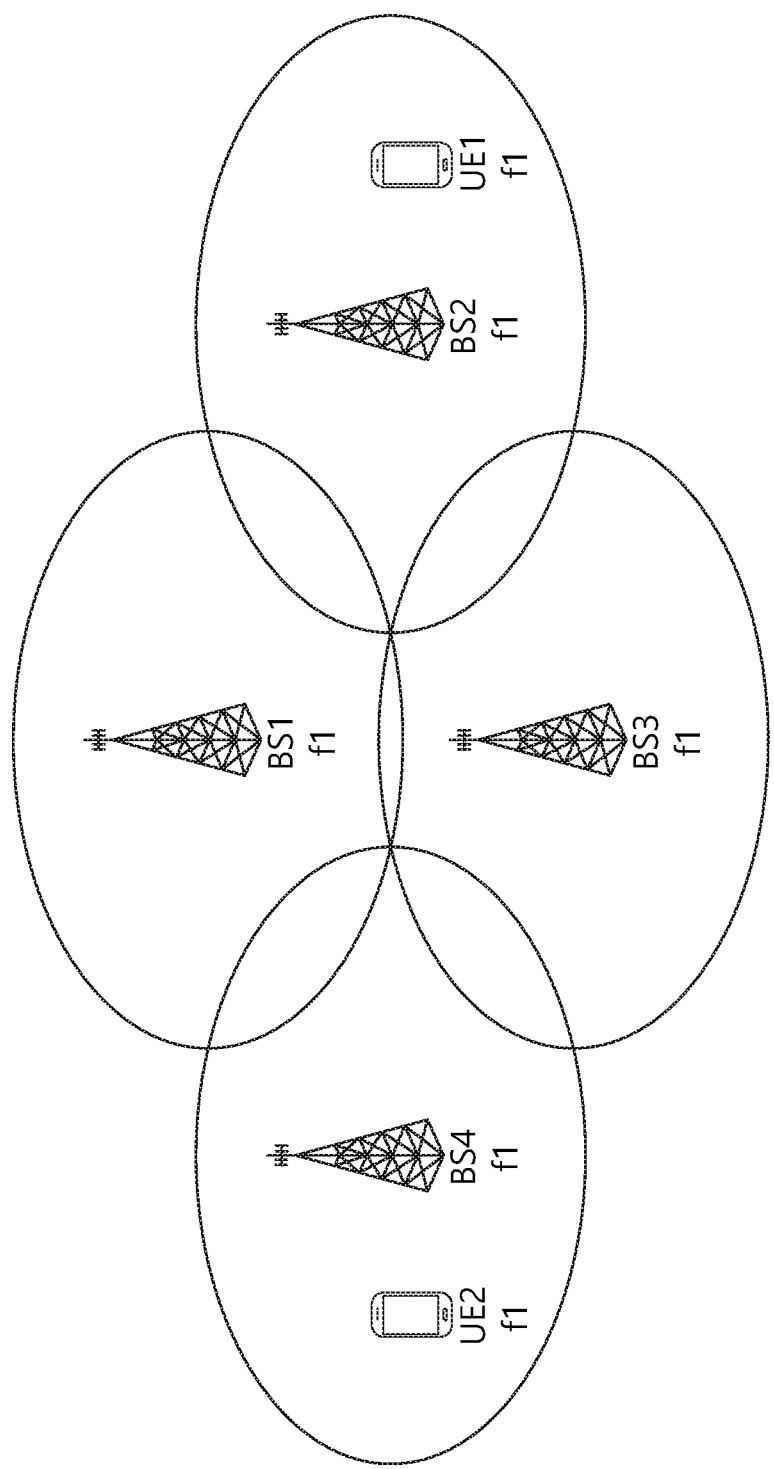
FIG. 7 shows a use of the same carrier frequency.

FIG. 7 shows a use of the same carrier frequency. Each of a BS1, a BS2, a BS3, and a BS4 has a proper cell coverage, and operates in a planned environment even in an unlicensed band, thereby not requiring a switching of a carrier frequency f1.

Figure 8:
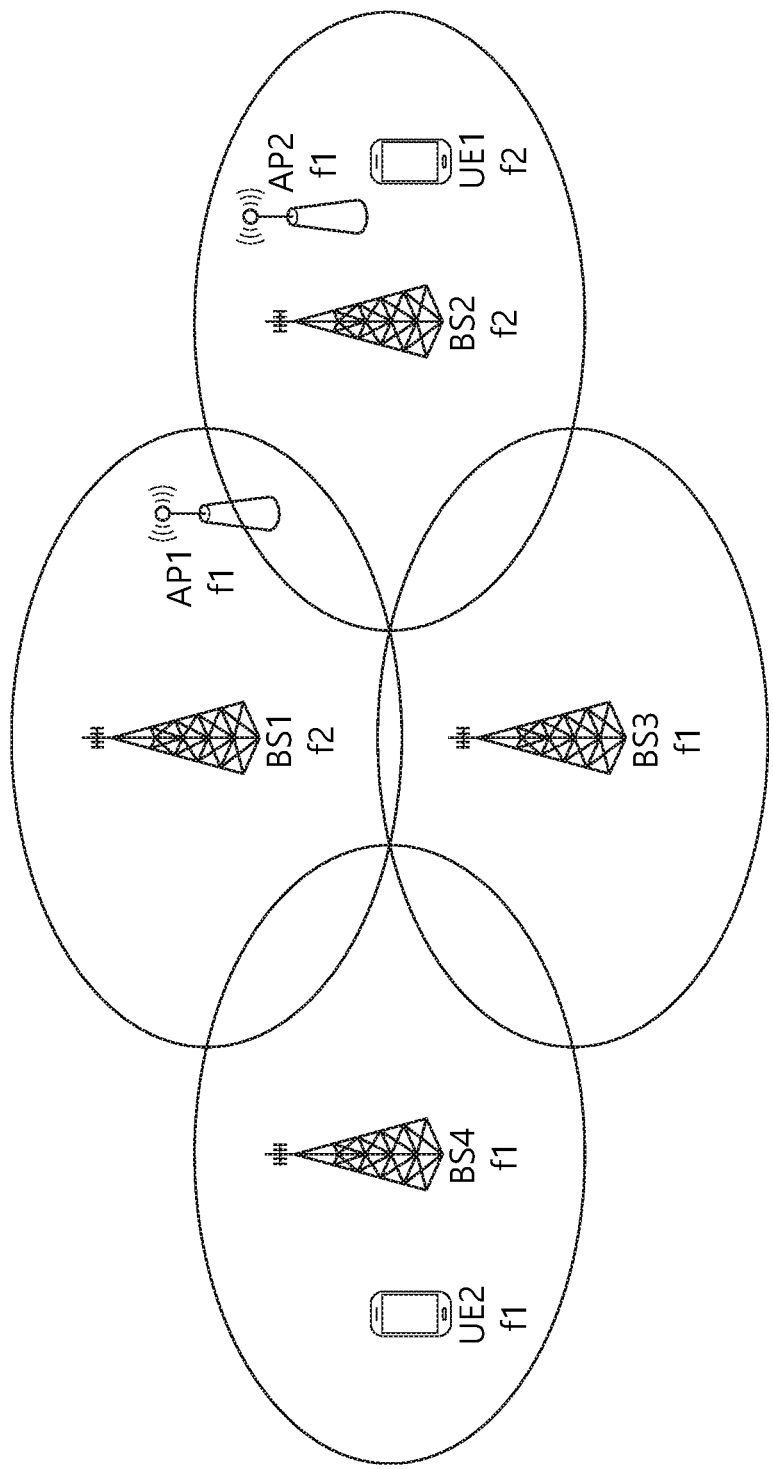
FIG. 8 shows an example of a carrier frequency switching.

FIG. 8 shows an example of a carrier frequency switching. If an AP1 and AP2 are deployed within a coverage of a BS1 and a BS2, and a carrier frequency of the AP1 and the AP2 is the same as a carrier frequency of the BS1 and the BS2, an interference may occur. Accordingly, the interference may be reduced by switching the carrier frequency of the BS1 and the BS2 from f1 to f2.

Figure 9:
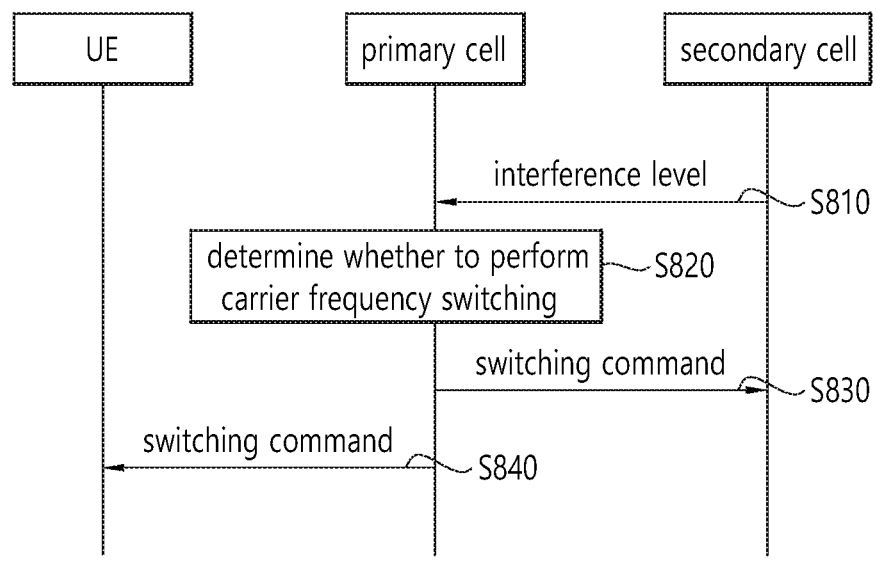
FIG. 9 shows a communication method according to another embodiment of the present invention.

FIG. 9 shows a communication method according to another embodiment of the present invention.

A secondary cell reports information regarding an interference level at an unlicensed band to a primary cell (S810). The primary cell may receive the information regarding the interference level from neighboring other cells and/or a UE.

The primary cell may determine whether to switch a carrier frequency of the secondary cell in the unlicensed band (S820). If it is determined that the switching of the carrier frequency is necessary, the primary cell may send a switching command to the secondary cell (S830).

The primary cell may also transmit the switching command for commanding the switching of the carrier frequency to a UE having access to the secondary cell (S840). The UE may switch the carrier frequency according to the received switching command.

The switching command for the UE may be transmitted through a radio resource control (RRC) message or a medium access control (MAC) message. Alternatively, the switching command for the UE may be transmitted through a control channel. According to the embodiment of FIG. 6, the switching command may be transmitted through the control channel.

The UE may assume that a default configuration (a cell ID, a system bandwidth, etc.) of a target cell accessed by the switching of the carrier frequency is identical to a default configuration of a source cell accessed before the switching. A network may report to the UE in advance the default configuration of cells which may become candidates of the carrier frequency switching, or may report this together with the switching command.

Figure 10:
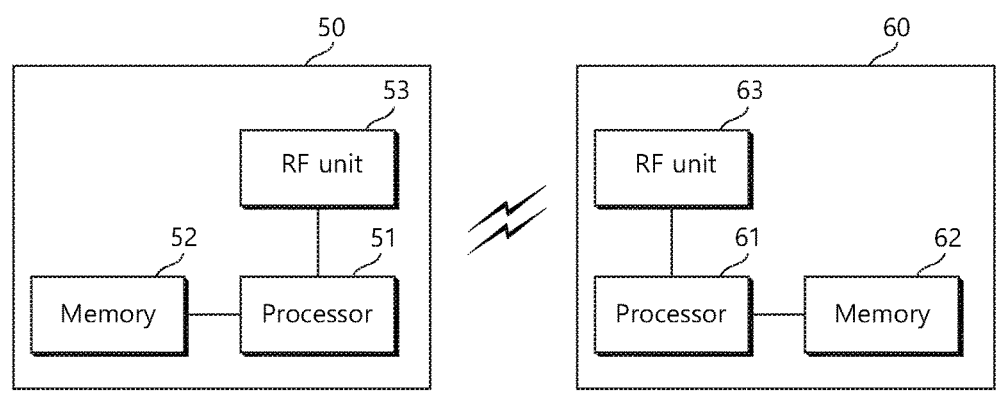
FIG. 10 is a block diagram showing a wireless communication system for implementing an embodiment of the present invention.

FIG. 10 is a block diagram showing a wireless communication system for implementing an embodiment of the present invention.

A wireless device 50 includes a processor 51, a memory 52, and a radio frequency (RF) unit 53. The memory 52 is coupled to the processor 51, and stores various instructions executed by the processor 51. The RF unit 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and an RF unit 63. The BS 60 may operate in a licensed band and/or an unlicensed band. The memory 62 is coupled to the processor 61, and stores various instructions executed by the processor 61. The RF unit 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating in a wireless communication system, the method comprising:
   receiving, by a wireless device, a switching command for instructing a switching between a clear channel assessment (CCA) operation and a non-CCA operation in an unlicensed band,
   wherein the switching command is received by detecting a physical downlink control channel (PDCCH) having a cyclic redundancy check (CRC) scrambled by a dedicated identifier, and
   wherein the dedicated identifier is a switching-radio network temporary identifier (S-RNTI) indicating the switching command; and
   performing, by the wireless device, the CCA operation or the non-CCA operation in the unlicensed band according to the switching command.

2. The method of claim 1, wherein the switching command is received from a cell operating in the licensed band.

3. The method of claim 2, wherein the cell operating in the licensed band is a primary cell.

4. The method of claim 1, further comprising:
   receiving information regarding a duration for performing the detection of the PDCCH.

5. A device in a wireless communication system, the device comprising:
   a radio frequency (RF) unit configured to transmit and receive a radio signal; and
   a processor operatively coupled to the RF unit and configured to:
      control the RF unit to receive a switching command for instructing a switching between a clear channel assessment (CCA) operation and a non-CCA operation in an unlicensed band, wherein the switching command is received by detecting a physical downlink control channel (PDCCH) having a cyclic redundancy check (CRC) scrambled by a dedicated identifier, and wherein the dedicated identifier is a switching-radio network temporary identifier (S-RNTI) indicating the switching command; and control the RF unit to perform the CCA operation or the non-CCA operation in the unlicensed band according to the switching command.

6. The device of claim 5, wherein the switching command is received from a cell operating in the licensed band.

7. The device of claim 6, wherein the cell operating in the licensed band is a primary cell.

* * * * *